US010702830B2

(12) United States Patent
Ong et al.

(10) Patent No.: US 10,702,830 B2
(45) Date of Patent: Jul. 7, 2020

(54) THERMAL WATER PURIFICATION SYSTEM AND METHOD FOR OPERATING SAID SYSTEM

(71) Applicant: Ecole Polytechnique Federale de Lausanne (EPFL), Lausanne (CH)

(72) Inventors: Chin Lee Ong, Lausanne (CH); John R. Thome, Pully (CH)

(73) Assignee: Ecole Polytechnique Federale de Lausanne (EPFL), Lausanne (CH)

( * ) Notice: Subject to any disclaimer, the term of this patent is extended or adjusted under 35 U.S.C. 154(b) by 2 days.

(21) Appl. No.: 16/083,731

(22) PCT Filed: Mar. 15, 2017

(86) PCT No.: PCT/IB2017/051497
§ 371 (c)(1),
(2) Date: Sep. 10, 2018

(87) PCT Pub. No.: WO2017/158526
PCT Pub. Date: Sep. 21, 2017

(65) Prior Publication Data
US 2019/0083935 A1 Mar. 21, 2019

(30) Foreign Application Priority Data
Mar. 16, 2016 (WO) .................. PCT/IB2016/051471

(51) Int. Cl.
*B01D 61/36* (2006.01)
*C02F 1/44* (2006.01)
(Continued)

(52) U.S. Cl.
CPC ......... *B01D 61/362* (2013.01); *B01D 61/366* (2013.01); *B01D 63/082* (2013.01);
(Continued)

(58) Field of Classification Search
None
See application file for complete search history.

(56) References Cited

U.S. PATENT DOCUMENTS

| 3,361,645 A | 1/1968 | Bodell |
| 4,545,862 A | 10/1985 | Gore et al. |
(Continued)

FOREIGN PATENT DOCUMENTS

| DE | 102009020179 A1 | 11/2010 |
| EP | 0088315 A1 | 9/1983 |
(Continued)

OTHER PUBLICATIONS

K. Zhao et al., Experimental Study of the Memsys Vacuum-Multi-Effect-Membrane-Distillation (V-MEMD) Module, Desalination 323; 2013; 12 pages.
(Continued)

*Primary Examiner* — Derek N Mueller
(74) *Attorney, Agent, or Firm* — Taft Stettinius & Hollister LLP

(57) ABSTRACT

A thermal water purification system and a related method including distilling units consecutively flowed through by raw feed liquid, each having a boiling liquid section and a vapor section, and including a heat exchanger cavity adapted to transfer thermal energy to the raw feed liquid before entering the boiling liquid section of a first distilling unit. Heat exchanger tubes in fluidic communication with the heat exchanger cavity extend through the boiling liquid section of the first distilling unit to transfer thermal energy from a medium in the tubes to cause the raw feed liquid to boil. Preheating tubes extend through the vapor section of each distilling unit to heat the raw feed liquid before entering the boiling sections using thermal energy from vapor condensing against external surfaces of the preheating tubes, which (Continued)

produces the distillate liquid that flows through a discharge port and a conduit supplying a storage tank.

16 Claims, 15 Drawing Sheets

(51) Int. Cl.
  *B01D 63/08* (2006.01)
  *C02F 103/08* (2006.01)
(52) U.S. Cl.
  CPC .......... *C02F 1/447* (2013.01); *C02F 2103/08* (2013.01); *C02F 2301/08* (2013.01); *Y02A 20/128* (2018.01)

(56) References Cited

U.S. PATENT DOCUMENTS 8,287,735 B2 * 10/2012 Hanemaaijer ........ B01D 1/0035
                                                        210/640
2010/0072135 A1   3/2010 Hanemaaijer et al.
2014/0216916 A1   8/2014 Heinzl
2015/0166371 A1   6/2015 Escher et al.

FOREIGN PATENT DOCUMENTS

| EP | 2606953 A1 | 6/2013 |
| WO | 2005089914 A1 | 9/2005 |
| WO | 2014020461 A1 | 2/2014 |
| WO | 2014058305 A1 | 4/2014 |
| WO | 2014163507 A1 | 10/2014 |

OTHER PUBLICATIONS

International Search Report; European Patent Office; International Application No. PCT/IB2017/051497; dated May 18, 2017; 4 pages.
Written Opinion of the International Searching Authority; European Patent Office; International Application No. PCT/IB2017/051497; dated May 18, 2017; 7 pages.

* cited by examiner

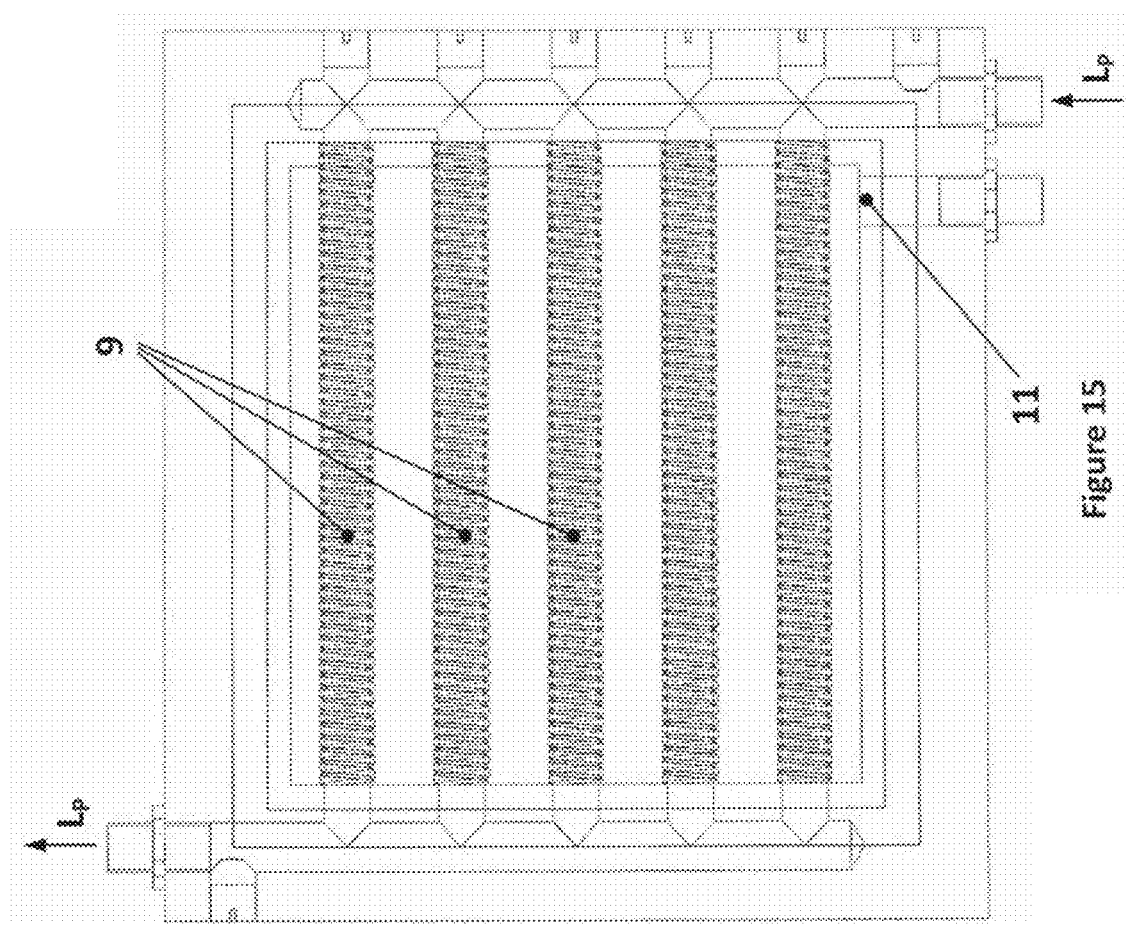

THERMAL WATER PURIFICATION SYSTEM AND METHOD FOR OPERATING SAID SYSTEM

CROSS REFERENCE TO RELATED APPLICATIONS

This application is a U.S. national stage filing of International Patent Application No. PCT/IB2017/051497 filed Mar. 15, 2017, which claims priority to International Patent Application No. PCT/IB2016/051471 filed Mar. 16, 2016, the contents of each application hereby incorporated by reference in their entirety.

FIELD OF THE INVENTION

The present invention relates to a thermal water purification system and a method for operating this thermal water purification system.

BACKGROUND OF THE INVENTION

Approximately 97 percent of water on the earth's surface is saline water, in view of the growing potable water consumption for domestic, agricultural or industrial applications, a need therefore exists to produce potable water from sources such as brackish water or seawater.

Different technologies permit to purify raw feed liquid, containing salt or other impurities, to produce potable water. The most commonly employed desalination techniques can be classified into two main categories, namely i) conventional thermal desalination such as Multi-Stage Flash (MSF), Multi-Effect Distillation (MED), Vapor compression (VC) and ii) non-thermal membrane based separation such as Reverse Osmosis (RO), Nanofiltration (NF), Forward Osmosis (FO), Electrodialysis Reversal (EDR), etc. Each individual technique has its own limitation ranging from low thermal efficiency such as Multi-Stage Flash (MSF) plants employing the flash evaporation process to Multi-Effect Distillation (MED) plants using spray evaporation of liquid feed to inefficient boron removal capabilities of non-thermal membrane based separation systems, such as RO, NF or EDR.

Membrane Distillation (MD) is a non-isothermal membrane separation process which employs hydrophobic membranes, first published in U.S. Pat. No. 3,361,645 A. With tremendous progress being directed towards membrane scientific research, efforts for industrial implementation of MD systems is currently gaining significant interest.

In brief, Membrane Distillation (MD) is a process which involves the evaporation of the heated liquid feed at the liquid/vapor interface located at the pores in a hydrophobic membrane. More specifically, evaporation of the liquid feed occurs only on the membrane pores and not in the bulk liquid feed. The rate of evaporation and vapor diffusion in MD is dependent on the transmembrane driving force, i.e. the difference in partial pressure of vapor across the membrane and the membrane permeability characteristic, which is defined based on the membrane geometrical parameters such as membrane pore size, membrane thickness, tortuosity and effective porosity. Therefore, a defined system configuration with a corresponding flow configuration such as temperature and feed flow rate will yield only a finite distillate flux in quantitative terms. Thermodynamically, one distinct characteristic of MD is a fall in the liquid feed temperature as evaporation progresses. This is defined as evaporative cooling, when sensible heat from the liquid feed is converted into latent heat during vaporization. The temperature drop of the liquid feed yields a lower driving force, resulting in a lower rate of vapor production and hence, a reduction in the global membrane distillate flux. The general limitations associated with low specific membrane flux, i.e. vapor/distillate produced per unit area of membrane and the closely inter-linked liquid feed temperature drop remain the most crucial disadvantages limiting the improving performance of the MD process for successful industrial implementation and commercialization. Tremendous efforts have been directed to capitalize on the MD process and various implementation techniques to increase the overall yield. This includes operating the MD system in partial vacuum to enhance liquid feed evaporation while reducing the vapor diffusion/transport resistance for enhanced condensation. Another solution includes heat recovery for partial reheating of the liquid feed to minimize the effect of a lower driving force arising from the liquid feed temperature drop. Reference is made to a recent peer reviewed journal paper related to a multi-effect MD apparatus by Zhao et al., 'Experimental study of the memsys vacuum multi-effect-membrane-distillation (V-MEMD) module', Desalination 323(2913), pp. 150-160 where those authors implemented a multiple heat recovery configuration via the integration of condensation foils and increased the membrane area to enhance the systemic yield of the apparatus. Although distillate production increased with an increased number of effects/stages and membrane area, two conclusions can be drawn from their experimental results. First, the specific flux was reduced from 3.8 to 3.0 l/m²-hr when the number of effects/stages was increased from 2 to 4 stages and second, a 55% reduction in specific flux from 8.7 to 3.9 l/m²-hr, was encountered when the number of membrane areas implemented in frames increased from 7 to 17 frames, i.e. 1.88 to 5.0 m². The overall systemic yield and thermal efficiency was thus adversely lower when compared against conventional thermal desalination processes.

The relatively high energetic consumption and low efficiency yield of such an implementation is attributed to an inefficient condensation process, when said vapor produced in the preceding stage is transported via a conduit into the succeeding stage to be condensed, resulting in increased vapor transport resistance, which in turn results in a higher vapor chamber pressure, which in turn lowers the transmembrane driving force, and hence reduces distillate yield.

One objective of the present invention is to propose a membrane based high thermal efficiency water purification system having much lower thermal and electrical energy consumptions but also with an increased overall systemic membrane flux. Potential industrial applications for such a system include desalination, industrial processes, water treatment, shale oil water treatment, wastewater treatment or water recovery processes that require the removal of dissolved solids or impurities from any raw feed liquid via the thermal separation process.

To improve the thermal efficiency of an existing thermal separation process, for example desalination, one solution consists to efficiently preheat the raw feed liquid. Efficient preheating of the raw liquid feed can be accomplished via thermal energy recovered from the vapor condensation process occurring in the respective vapor sections, ideally, low vapor transport resistance will yield an optimum condensation process, which is not the case when vapor transmission conduits are present to channel vapor between preceding/succeeding modules to be condensed. More specifically, no specific gain in the specific membrane flux (L/m²-hr) can be achieved without towering the vapor transport resistance. For distilling systems capitalizing on the MD process, an increase in membrane area is used to accomplish this; that is, a large membrane surface area ensures sufficient vapor is produced to accommodate latent heat recovery for raw feed preheating and the reheating of the distilling liquid feed to minimize the temperature drop. This is not within the scope of the present invention as minimal membrane area and low vapor transported resistance via direct condensation are proposed in this present invention.

The present invention does not solely capitalize on the MD process, but a hybrid implementation of a combined flow boiling—MD process to increase distillate yield. The integration of heat exchanger boiling tubes into stages induces nucleate flow boiling on the external surfaces of the tubes in contact with the liquid feed located in boiling liquid sections. This nucleate flow boiling process occurring on the external surface of the tubes is technically dissimilar to processes such as spray falling film evaporation, flashing of vapor or evaporation at the liquid/vapor interface of a liquid, known already in other prior arts. The current implementation serves to augment the performance of such a distillation system by incorporating nucleate flow boiling heat exchanger tubes as the main vaporization process while complementing the MD process. This novel boiling feature and device, implemented in this current invention, will significantly increase vapor/distillate production and can yield up to a 95% increase of the total distillate, with the remaining distillate being produced via the MD process (essentially a few fold increase in capacity with respect to a MD only system). The scope of the invention widely diners from the state-of-the-art of MD systems in that it requires minimal membrane area but yet is capable of producing a higher distillate yield by primarily capitalizing on the combination of flow boiling on the external surfaces of the heat exchanger tubes within the boiling liquid sections and evaporation at the membrane surface via the MD process.

The second aspect of the invention involves the minimization of thermodynamic losses while significantly optimizing the heat and mass transport resistance across the distilling modules, resulting in a significant increase in the overall efficiency and performance of the distillation system. This is achieved by implementing direct vapor condensation via introduction of heat exchanger preheating tubes and/or internally flow boiling tubes within each immediate vapor section adjacent to the boiling liquid sections. This promotes simultaneous joint heat transfer processes involving, i) flew boiling on the heat exchanger tubes in the boiling liquid sections and ii) increased membrane evaporation via the MD process and iii) direct condensation on the external surface of the heat exchanger preheating tubes and/or internally flow boiling tubes in the vapor sections of the distilling units. Vapor transmission lines are thus eliminated by this present invention. The first advantage of the elimination of vapor transmission lines is prevention of oversaturation of the vapor sections, thus mitigating the rise in the vapor chamber pressure which would lead to lower transmembrane driving force. The direct condensation process, as proposed in this invention, results in a lower vapor chamber pressure, and thus enhances the MD process by maintaining a higher transmembrane driving force. In general, a 5% reduction in vapor chamber pressure will lead to a 5% increase in vapor production via the MD process. The second advantage is the elimination of vapor condensation in the transmission lines, which does not contribute to the heat recovery/vaporization process. For example, consider an 8 module distillation system with ideal efficiency; a loss of 1 kg of vapor due to condensation in the transmission line from the first module can result in a loss of 7 liters in distillate production from the succeeding distilling modules (assuming a liquid density, $\rho$ of 1 kg/L), i.e. 1 liter of lost distillate production in each module from the $2^{nd}$ to the $8^{th}$ effect/stage. The third advantage involves lower thermal and mass transport resistance across the distilling modules, where the lower temperature drop is highly advantageous as this allows an increased number of effects/stages to be incorporated into the system which in turn reduces the specific energy (thermal and electrical) consumption of the distillation system.

Internal flow boiling tubes provides the additional flexibility to accommodate efficient direct condensation of vapor in the vapor chamber adjacent to the porous membrane. Phase change heat transfer, i.e. condensation and flow boiling, are known to be superior heat transfer processes due to their lower thermal resistances when compared to single-phase all liquid heat transfer. Five significant advantages can be derived with the integration of internal boiling heat exchanger tubes, namely, i) accommodating condensation of vapor on the external tube periphery of the said internal flow boiling tubes when said raw liquid feed temperature flowing internally within the preheating tubes has risen equal to the vapor temperature and no vapor condensation occurs, ii) extra vapor generation via internal flow boiling of the liquid feed flowing within the internally boiling tubes arising from the heat exchanger tube flow boiling, iii) enhanced condensation within the vapor chamber resulting in a lower vapor chamber, thus, a higher transmembrane pressure difference, iv) increasing the efficiency of the raw feed liquid preheating process when said hotter distillate condenses on the external surface of the internally flow boiling tubes flowing downwards due to gravity, preheating the raw liquid flowing inside the preheating tubes, and, v) accommodating a higher thermal energy load into the system. Under high thermal load conditions, when the said raw feed liquid temperature flowing in the preheating tubes is equal to the vapor temperature in the vapor chamber, and thus no additional vapor condensation on the preheating tubes is feasible, the internally flow boiling tubes will act as the heat sink by converting this additional latent heat arising from the vapor condensation process to latent heat of vaporization via flow boiling. For example, consider an 8 module distillation system with ideal efficiency. An additional 1 kW of thermal energy consumed to generate vapor via the flow boiling process in the boiling liquid section of the first effect can be effectively consumed via the internal flow boiling process by the internal flow boiling tubes inside the vapor section of the first effect. This results in an additional eight times gain in vapor/distillate produced by the 8 module distillation system (distillate production equivalent to 8 kW of thermal energy assuming ideal efficiency) This performance enhancement is technically not achievable with the integration of solely the preheating tubes. A performance comparison simulation is presented in the later section of this disclosure.

EP 0088315 A1 discloses a desalination device and process comprising a spiral wound air gap membrane distillation device with heat recovery for raw feed liquid preheating. In this prior art, a spirally elongated vapor permeable membrane separates the feed liquid from the elongated vapor chamber white a vapor impermeable layer acting as a condensing sheet separates the condensing vapor from the raw feed liquid to be preheated. Internal raw feed liquid preheating is accomplished using thermal energy transferred from the condensing vapor. The condensed distillate then flows toward a distillate outlet located in the downstream direction of the hot feed liquid flow. In this embodiment, a single evaporation and condensation process is disclosed as opposed to multiple vaporization and condensation process presented in the current invention. This invention capitalizes primarily on the membrane distillation (MD) principle as opposed to the current combined processes of heat exchanger tube flow boiling and the MD principle in the current invention.

WO 2005/089914 A1 discloses a single spiral wound and multi-stage membrane distillation device and method with raw feed liquid preheating solution being accomplished externally using thermal energy from the condensing vapor, brine liquid and liquid distillate. In the plurality membrane distillation apparatus embodiment, the vapor produced in the evaporator and subsequent stages is channeled via a conduit from one stage to another stage for feed liquid reheat. One of the disadvantages is increased vapor transport resistance and transmission losses. The loss of vapor in the transmission conduit due to condensation within the conduit will result in a non-efficient heat recovery process for the feed liquid reheat and an overall loss in distillate yield. This invention capitalizes primarily on the membrane distillation (MD) principle as opposed to the current fully integrated heat exchanger tube flow boiling and MD processes presented in the current invention. DE 102009020179 discloses a multi-stage membrane distillation apparatus having an evaporator and multiple condensation/evaporation stages. Raw feed liquid preheating is accomplished via an external thermal energy source. This solution does not implement any integrated compact raw feed liquid preheating configuration in the vapor chamber, which is the objective of the present invention. This invention capitalizes primarily on the membrane distillation (MD) principle as opposed to the current fully integrated processes of heat exchanger tube flow boiling and MD processes presented in the current invention.

Another example, US 2014/0216916 A1 discloses a membrane distillation device for the purification of a feed liquid, comprising a plurality of condensation/evaporation stages, in which the raw feed liquid is preheated in at least one additional vapor chamber, to which the vapor fed to one condensation/evaporation stage is supplied and in which the vapor is condensed. In this disclosure, the vapor produced is again channeled via a conduit from one stage to another stage. This incurs additional vapor transport resistance and, thus, can result in an increase in the vapor chamber pressure and as a consequence, results in a less efficient vaporization process. In all the embodiments, this invention implements vapor transmission lines/conduits to accommodate raw liquid feed preheating and reheating of the liquid feed. As clearly indicated in the text description and figures, heat recovery for feed preheating is facilitated via an enlarged condensation/evaporation stage at the rear end of each distilling module to accommodate the preheating device, which is separated from the evaporation and condensation unit. Furthermore, this solution does not implement an integrated compact direct feed preheating configuration that minimizes heat/mass transport resistance, which is another objective of the present invention. Heat exchanger flow boiling tubes are not implemented in the liquid section of the modules to generate vapor and preheating tubes are not being implemented within the vapor chamber directly adjacent to the porous membranes. This invention also does not implement any internal flow boiling tubes within the vapor chambers. More specifically, this invention capitalizes primarily on the membrane distillation (MD) principle as opposed to the integrated heat exchanger tube flow boiling and MD processes presented in the current invention. Thus, one notes that there are no flow boiling tube devices to generate vapor, while the current invention implements this process.

WO 2014/020461 A1 discloses a desalination system comprising a steam raising device, a membrane distillation device and a heat exchange device, wherein the liquid fed into the heat exchange device is heated by the brine liquid from the steam raising device. In this prior art, the vapor produced in the steam raising device is channeled via a conduit into another membrane distillation module. Hence, this invention implements vapor transmission lines/conduits to accommodate vapor condensation. This causes increased heat and mass transfer resistance, resulting in a less efficient condensation/evaporation process. Clearly, this invention relates to the conventional MD principle whereby the flow process is modified to introduce partial liquid feed boiling on the non-permeable condensation walls via heat recovery from the liquid brine and condensing vapor. Notably, heat exchanger flow boiling tubes are not being implemented in the liquid section of the modules to generate vapor and preheating tubes are not being implemented within the vapor chamber directly adjacent to the porous membranes. This invention also does not implement any internal flow boiling tubes within the vapor chambers, which is the scope of this current invention. Furthermore, the vapor condensation and preheating process is accomplished by means of external heat exchangers resulting in a non-compact structure for the system.

US 2010/0072135 A1 discloses a membrane distillation method (or the purification of a liquid. This invention does not implement any tubular flow boiling process to increase distillate yield; distillate yield is achieved only via the membrane distillation process. There are no integrated flow boiling devices to induce boiling (hence additional vapor production) within the distillation apparatus. Additionally, no internally flow boiling tubes are implemented in the system. The distillate yield for this invention depends entirely on the membrane area whereby higher yield will require additional membrane area. In the current invention, the primary process is accomplished via heat exchanger tube flow boiling while MD is only identified as the secondary process.

EP 2 606 953 A1 discloses a membrane distillation system comprising a plurality of membrane distillation modules that are pressure wise coupled in series and that where distillate exit is provided with a fluid permeable hydrophilic membrane, wherein the fluid permeable membrane is an elastomeric valve. The disclosure claims the membrane distillation unit operated at the lowest pressure is coupled to the distillate collector unit via a siphon and that a heat exchanger is present between the distillate collector, the first of said fluid-permeable membrane and that a plurality of inputs coupled with said distillate exits are extended with a heat exchanger along the said connection preferably in a counter flow direction. The inventors also claim that the membrane distillation system has a steam riser circuit comprised of a heat exchanger where the fluid in the steam riser circuit is heated via rest heat from other systems. Therefore, this invention does not describe a heat exchanger tube flow boiling process, using preheating tubes for raw feed preheating, and internally flow boiling tubes inside the vapor chambers.

WO 2014/163507 A1 relates to a membrane distillation system and an energy source to provide heat for the MD process, wherein the energy source originates from the generator and is transferred via an intermediate cycle to the first distillation module. Fluid feed is heated up via a heat exchanger and optionally partially evaporating the fluid in the circuit to produce a two-phase food mixture before channeling the said liquid into the first membrane module. This invention capitalizes on the membrane distillation process including the preference of introducing two-phase feed into the membrane modules. Therefore, contrary to the current invention. WO 2014/163507 A1 does not disclose a distillation module with hybrid features comprising devices such as integrated flow boiling tubes in the liquid feed section, preheating and internally flow boiling tubes in the vapor chambers.

WO 2014/058305 A1 discloses a membrane distillation system and the method of starting up such a system and the use thereof. This invention relates to externally generating a multi-phase feed using a pretreatment module before channeling the said feed into a steam generator. This invention does not propose a distillation module with hybrid features comprising devices such as integrated flow boiling tubes inside the liquid feed section, preheating and internally flow boiling tubes in the vapor chambers.

SUMMARY OF THE INVENTION

In this view, the present invention relates to a thermal water purification system for producing a distillate liquid from a raw feed liquid comprising.

a plurality of distilling units which are consecutively flowed through by the raw feed liquid;

wherein each distilling unit comprises one boiling liquid section and one vapor section adjacent thereto;

wherein the boiling liquid section of each distilling unit comprises a plurality of inlet and outlet ports, through which respectively enters and exits the raw feed liquid;

wherein any two consecutive distilling units, respectively an upstream and a downstream distilling units, are implemented such that the boiling liquid section of the downstream distilling unit is separated from the vapor section of the upstream distilling unit by a liquid-tight and vapor-tight separation plate and from the vapor section of the downstream distilling unit by a liquid-tight and vapor-permeable membrane:

a heat exchanger cavity adapted to transfer thermal energy to tho raw feed liquid before said raw feed liquid enters into the boiling liquid section of one first distilling unit;

a plurality of heat exchanger tubes extending through the boiling liquid sections of said first distilling unit and, preferably, i further consecutive distilling units, i>0, said heat exchanger lubes being configured to transfer thermal energy from a hot medium contained thereinside to the raw feed liquid flowing thereoutside, thus leading the raw feed liquid to boil inside the boiling liquid sections;

a plurality of preheating tubes extending through the vapor sections of the distilling units, said preheating tubes being consecutively flowed through by the raw feed liquid before said raw feed liquid flows inside the boiling liquid sections of the distilling units and being configured to heat the raw feed liquid contained thereinside by using thermal energy transferred by the vapor contained inside the vapor sections of the distilling units when said vapor condenses against the external surfaces of the preheating tubes, thus producing a distillate liquid that flows outside of the vapor section of each distilling unit through a distillate discharge port;

a distillate conduit in fluidic communication with said distillate discharge ports, said distillate conduit supplying a storage tank with the distillate liquid.

Important features of the thermal water purification system are defined in dependent claims 2 to 7.

The present invention relates also to the method for operating the thermal water purification system according to any one of claims 1 to 7, comprising the steps of;

a) channeling a raw feed liquid having initially a first temperature towards the boiling liquid section of a first distilling unit through a plurality of preheating tubes adapted to increase the temperature of the raw feed liquid from said first temperature to a second temperature;

b) channeling the raw feed liquid having said second temperature towards the boiling liquid section of said first distilling unit through a heat exchanger cavity adapted to increase the temperature of the raw feed liquid from said second temperature to a third temperature by using thermal energy transferred from a hot medium;

c) channeling the raw feed liquid having initially said third temperature, or a temperature slightly lower than said third temperature, into the boiling liquid sections of said first distilling unit and, thereafter, of a plurality of consecutive distilling units;

d) heating said raw feed liquid with a plurality of heat exchanger tubes extending through the boiling liquid sections of said first distilling unit and, preferably, i further consecutive distilling units, i>0, so as to boil the raw feed liquid flowing inside said boiling liquid sections with a decrease of the temperature of the raw feed liquid in each boiling liquid section due to the drop in pressure inside each boiling liquid section from the inlet ports thereof to the outlet ports thereof;

e) passing the vapor produced by the vaporization of the raw feed liquid boiling in the boiling liquid section of each distilling unit through the liquid-tight and vapor-permeable membrane into the vapor section adjacent thereto;

f) condensing said vapor into said vapor section to produce a distillate liquid;

g) channeling said distillate liquid into a storage tank.

Important features of the method of the present invention are defined in dependent claims 9 to 11.

Thus configured, the thermal water purification system of the present invention optimizes thermal energy and mass transfer process that improves the overall energetic efficiency of the system. The implementation of heat exchanger tubes in the boiling liquid sections in several consecutive distilling unit yields additional vapor in addition to vapor produced via membrane induced evaporation. The main source of the vapor generated via flow boiling on the external surface of the heat exchanger boiling tubes results in up to 95% of the distillate production while the MD process now acts as a secondary process adding about 5% of the production of distillate. The boiling liquid section which is adjacent to the vapor section eliminates any vapor transmission lines, thus reducing the vapor transport resistance and thermal energy losses due to condensation within the transmission lines.

Compactness is improved by implementing raw feed liquid preheating tubes in the vapor section for direct vapor condensation, improving the thermal energy recovery process and permitting increased vaporization of the boiling raw feed liquid in the boiling liquid sections. Furthermore, higher efficiency is achieved by implementing at least one internal boiling heat exchanger tube in the vapor section channeling the raw feed liquid flowing thereinside, optimizing the thermal energy recovery process even further via the reuse of thermal energy for additional vaporization of the raw feed liquid.

The present invention implements an integrated process of boiling—evaporation—direct condensation for efficient heat recovery and reuse within a compact distilling unit, improvements in the heat and mass transfer process increases the overall thermodynamic efficiency of the system, thus permitting the integration of more distilling units for an increased systemic yield.

BRIEF DESCRIPTION OF THE DRAWINGS

Other features and advantages of the present invention will appear more clearly from the detailed description of one embodiment of the invention which is presented solely by way of a non-restricted example and illustrated by the attached drawings in which:

FIG. 15 is a front view of the vapor section illustrated in FIG. 10, the elements surrounding the preheating tubes being seen by transparency.

DETAILED DESCRIPTION OF EMBODIMENTS OF THE INVENTION

Figure 1:
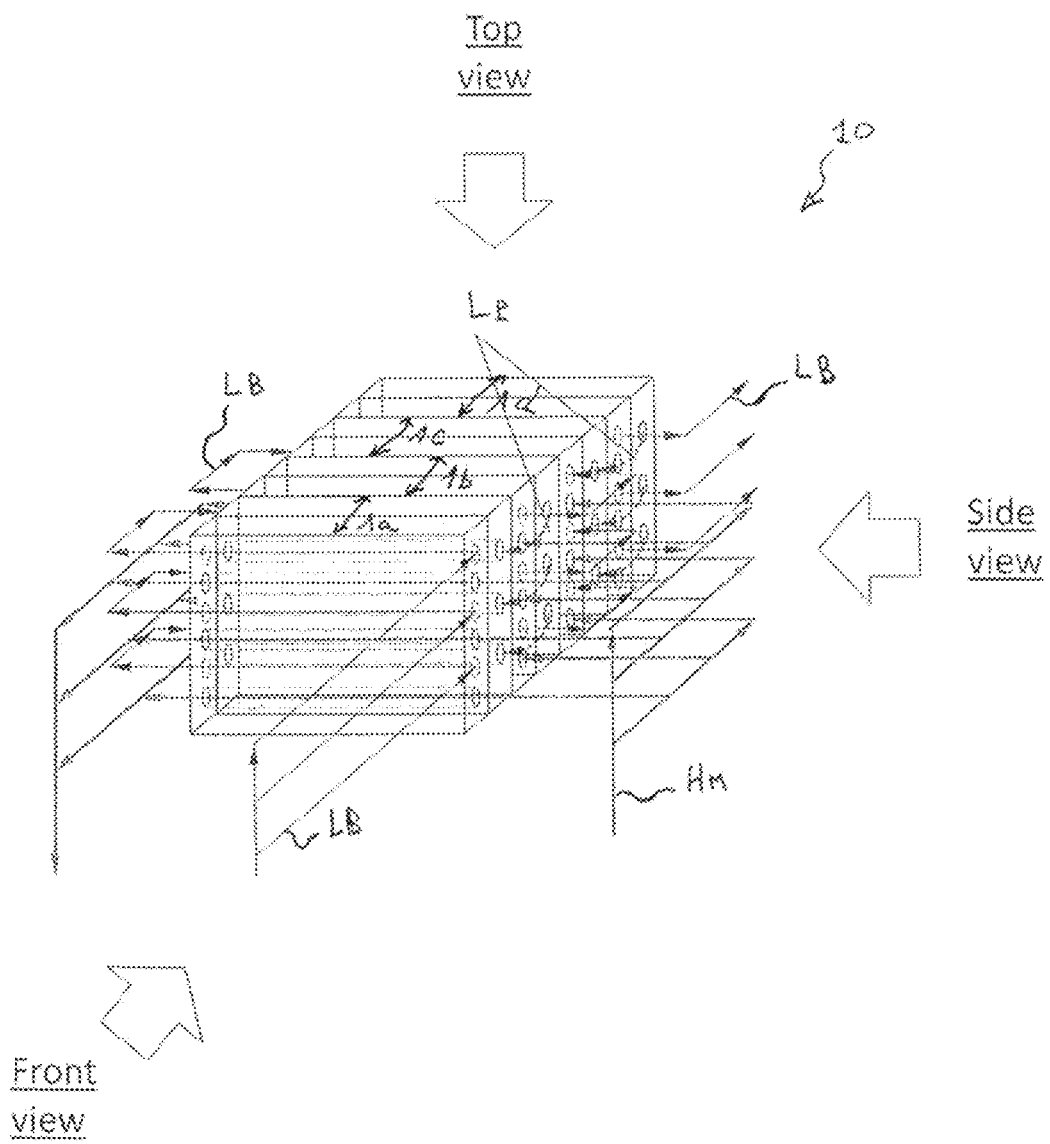
FIG. 1 is a schematic perspective view of a thermal water purification system according to an exemplary embodiment of the present invention, with four consecutive distilling units.

In reference to FIG. 1, there is shown an exemplary embodiment of the thermal water purification system according to the present invention.

In this embodiment, the thermal water purification system 10 comprises first to fourth adjacent distilling units 1a, 1b, 1c and 1d which are consecutively flowed by the raw feed liquid to be concentrated. This raw feed liquid can be brackish water, seawater or industrial process wastewater for example. This raw feed liquid flows inside the system according to a specific flow circuit and flow direction illustrated in FIG. 1 by two types of arrows. The first type of arrows corresponds to conduits, pipes or conducts for transporting the raw feed liquid $L_P$ from the fourth distilling unit 1d to the first distilling unit 1a. As detailed in the following paragraphs, the raw feed liquid $L_P$ is thus preheated before flowing through a heat exchanger cavity, which is adapted to increase the temperature of the raw feed liquid $L_P$ till said raw feed liquid is partially boiling or close to its boiling point. In the following paragraphs, to better distinguish the raw feed liquid exiting from the heat exchanger cavity, the term "boiling raw feed liquid" and the reference $L_B$ will be used in replacement of the term "raw feed liquid" and the reference $L_P$. Further heat exchanger elements may advantageously be provided to heat the boiling raw feed liquid $L_B$. Such heat exchanger elements may consist in a plurality of heat exchanger tubes, through which is flowing a hot medium $H_M$, such as hot water or steam. As illustrated in FIG. 1, these heat exchanger tubes are partially integrated to one or more distilling units, thus optimizing the space occupied by the system and limiting the thermal losses during the transport of the fluid. The second type of arrows corresponds to conduits, pipes or conducts for transporting the boiling raw feed liquid $L_B$ from the first distilling unit 1a to the fourth distilling unit 1d. During this transport, the vapor phase of said boiling raw feed liquid $L_B$ is separated from the liquid phase thereof, said vapor phase being afterwards condensed against cold surfaces of the system and collected as a distillate liquid.

Figure 2:
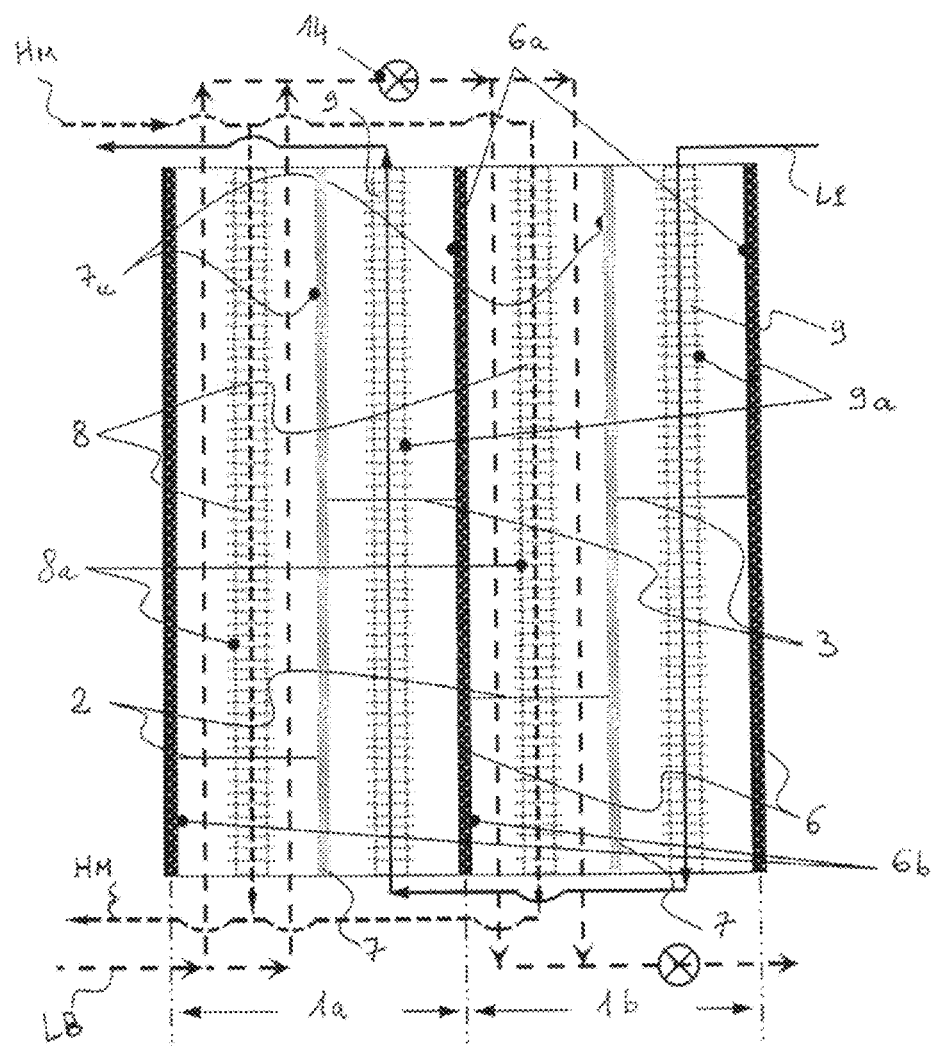
FIG. 2 is a schematic top view of two consecutive distilling units of the system illustrated in FIG. 1.
Figure 3:
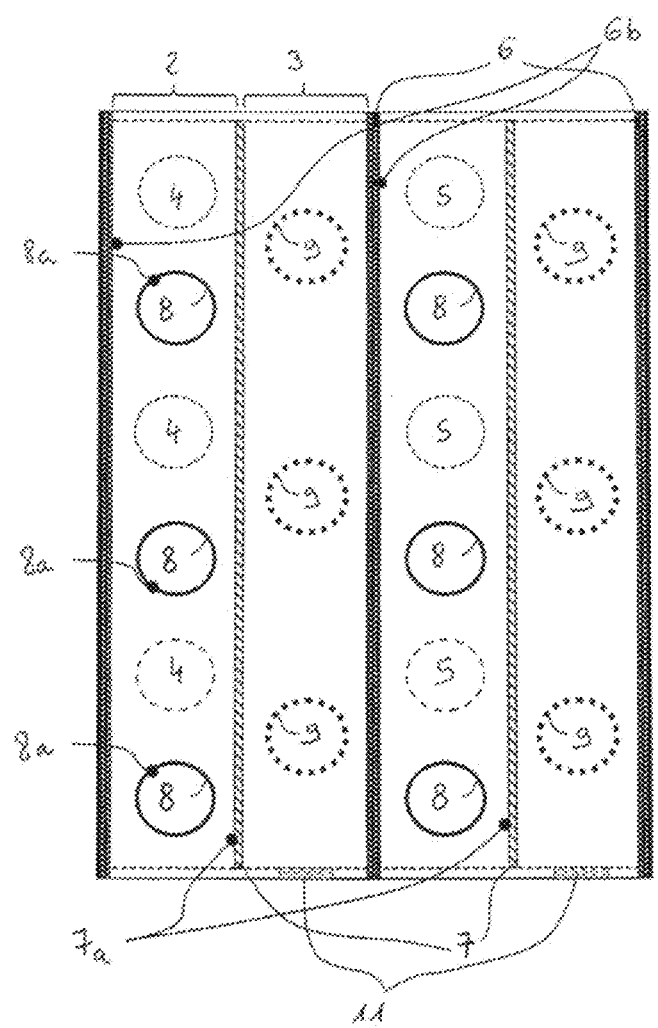
FIG. 3 is a schematic side view of the distilling units illustrated in FIG. 2.

In reference to FIGS. 2 and 3, there is shown two consecutive, i.e. first and second, distilling units 1a, 1b of the system 10 shown in FIG. 1.

Each distilling unit comprises one boiling liquid section 2 and one vapor section 3 adjacent thereto, said sections 2, 3 being separated by a liquid-tight and vapor-permeable membrane 7. This membrane 7 is configured to, on the one hand, prevent that the liquid phase of the boiling raw feed liquid $L_B$ flowing inside the boiling liquid section 2 to flow across to the vapor section 3, and, on the other hand, permit the evaporation of the boiling raw feed liquid $L_B$ on its surface 7a and allow the vapor phase of said boiling raw feed liquid $L_B$ to diffuse across into the vapor section 3 through its pores. The boiling liquid section 2 of the second distilling unit 1b is separated from the vapor section 3 of the first distilling unit 1a by a liquid-tight and vapor-tight separation plate 6, which may advantageously be provided with enhanced micro-structures such as micro-cavities or micro-projecting fins. This plate 6 is configured to prevent any fluid circulation between the two adjacent sections and permit the film wise condensation of the vapor phase of the boiling raw feed liquid $L_B$ flowing inside the vapor section 3 on the surface 6a that is oriented towards said vapor section. Furthermore, this plate 6, which is heated during the condensation process, has a hotter surface 6b that is oriented towards the boiling liquid section 2 of the second distilling unit 1b. This hotter surface 6b, which is in contact with the boiling raw feed liquid $L_B$ flowing inside said boiling liquid section 2, may lead to flow boiling of said boiling raw feed liquid on surface 6b. To improve again the production of vapor in the boiling liquid section 2, a plurality of heat exchanger tubes 8 advantageously extend through said boiling liquid section 2. These heat exchanger tubes 8, which are flowed through by the hot medium $H_M$, transfer thermal energy via their external surfaces 8a to the boiling raw feed liquid $L_B$ flowing inside the boiling liquid section 2 so that this boiling raw feed liquid $L_B$ boils in contact to said external surfaces 8a. The heat exchanger tubes 8 may advantageously be provided with internally and externally enhanced structures such as projecting fins arranged along their external surfaces 8a and internal ribs so as to enhance the thermal transfer occurring between the outside of said tubes and the inside thereof, thus enhancing the boiling of the boiling raw feed liquid $L_B$ against the external surfaces of the said heat exchanger tubes 8.

The boiling raw feed liquid $L_B$ successively enters in the boiling liquid section 2 of the first distilling unit 1a through inlet ports 4, is partially vaporized via boiling and evaporation in said boiling liquid section 2, the vapor phase being diffused across the membrane 7 and the liquid phase exiting the boiling liquid section 2 through outlet ports 5. Thereafter, this liquid phase is channeled via conduits to the inlet ports 4 of the boiling liquid section 2 of the second distilling unit 1b. Throttle or flash valves 14 may advantageously be disposed along the conduits between the outlet ports 5 and the inlet ports 4 so as to reduce the pressure of the boiling raw feed liquid $L_B$. This process may be repeated for the second distilling unit 1b, and, thereafter, for each successive distilling unit of the system 10.

To preheat the raw feed liquid, the system 10 comprises a plurality of preheating tubes 9 extending through the vapor sections 3 of the distilling units 1a-1d, said preheating tubes 9 being consecutively flowed through by the raw feed liquid before said raw feed liquid flows through the heat exchanger cavity and, thereafter, through the boiling liquid sections 2 of said distilling units 1a-1d. These preheating tubes 9 permit to preheat the raw feed liquid contained thereinside by using thermal energy transferred by the condensing vapor contained in the vapor sections 3 of the distilling units 1a-1d when said vapor condenses against external surfaces 9a of the preheating tubes 9. To enhance the thermal transfer occurring between the outside of said tubes and the inside thereof, said tubes 9 may advantageously be provided with projecting fins arranged along their external surfaces 9a and internal rib structures.

Figure 7:
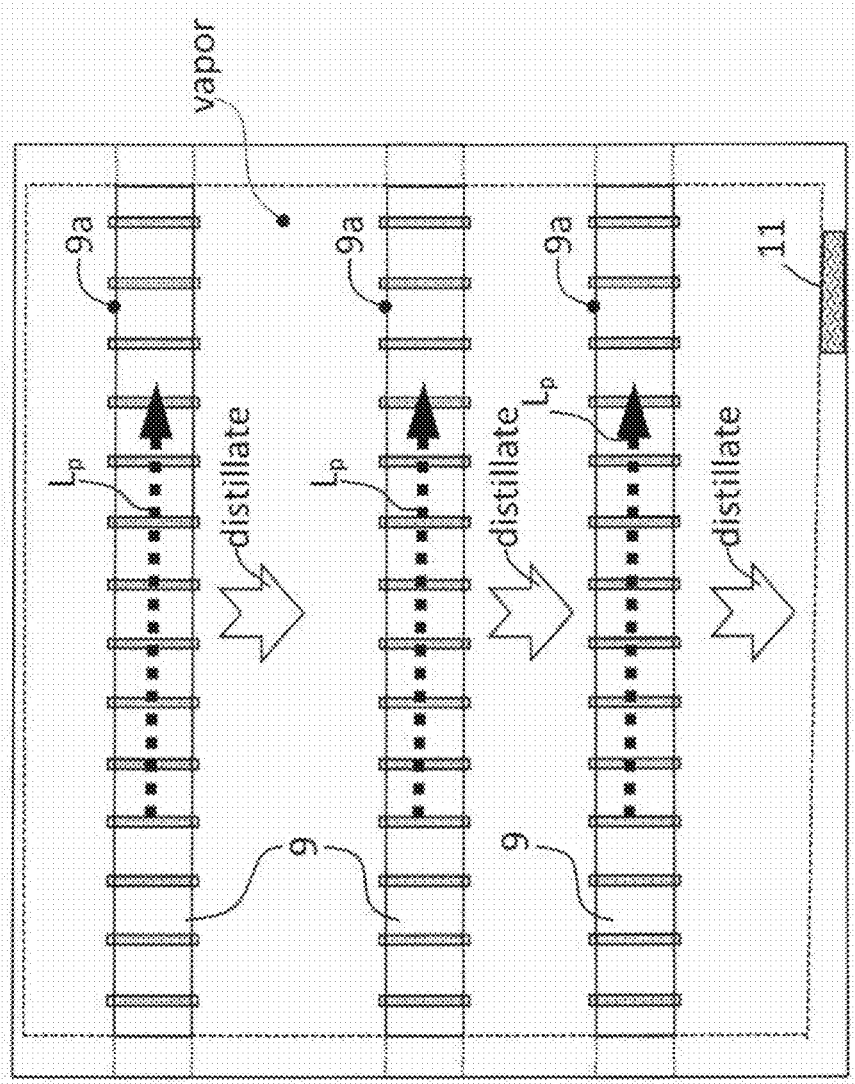
FIG. 7 is a schematic front view of a vapor section of the distilling units illustrated in FIG. 2.

In the embodiment shown in FIGS. 2, 3 and 7, three vertically spaced-apart preheating tubes 9 with the raw feed liquid $L_P$ to be preheated flowing thereinside are disposed in each vapor section 3 of the distilling units 1a-1d. The distillate liquid produced by the condensation of the vapor against external surfaces 9a of said preheating tubes 9 and against surfaces 6a of the separation plate 6 flows downwards in the bottom part of said vapor sections 3 and exits therefrom through distillate discharge ports 11 provided in a bottom side of said vapor sections. Thereafter, this distillate liquid is channeled towards a storage tank via a distillate conduit that is in fluidic communication with the distillate discharge ports 11.

Figure 4:
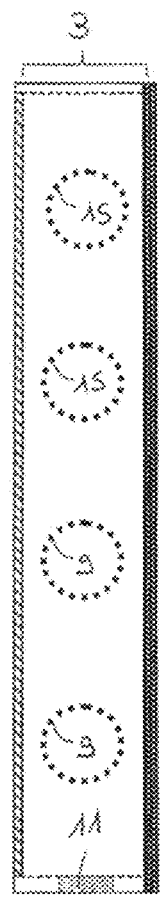
FIG. 4 is a schematic side view of a vapor section of a distilling unit in a further embodiment of the present invention.
Figure 8:
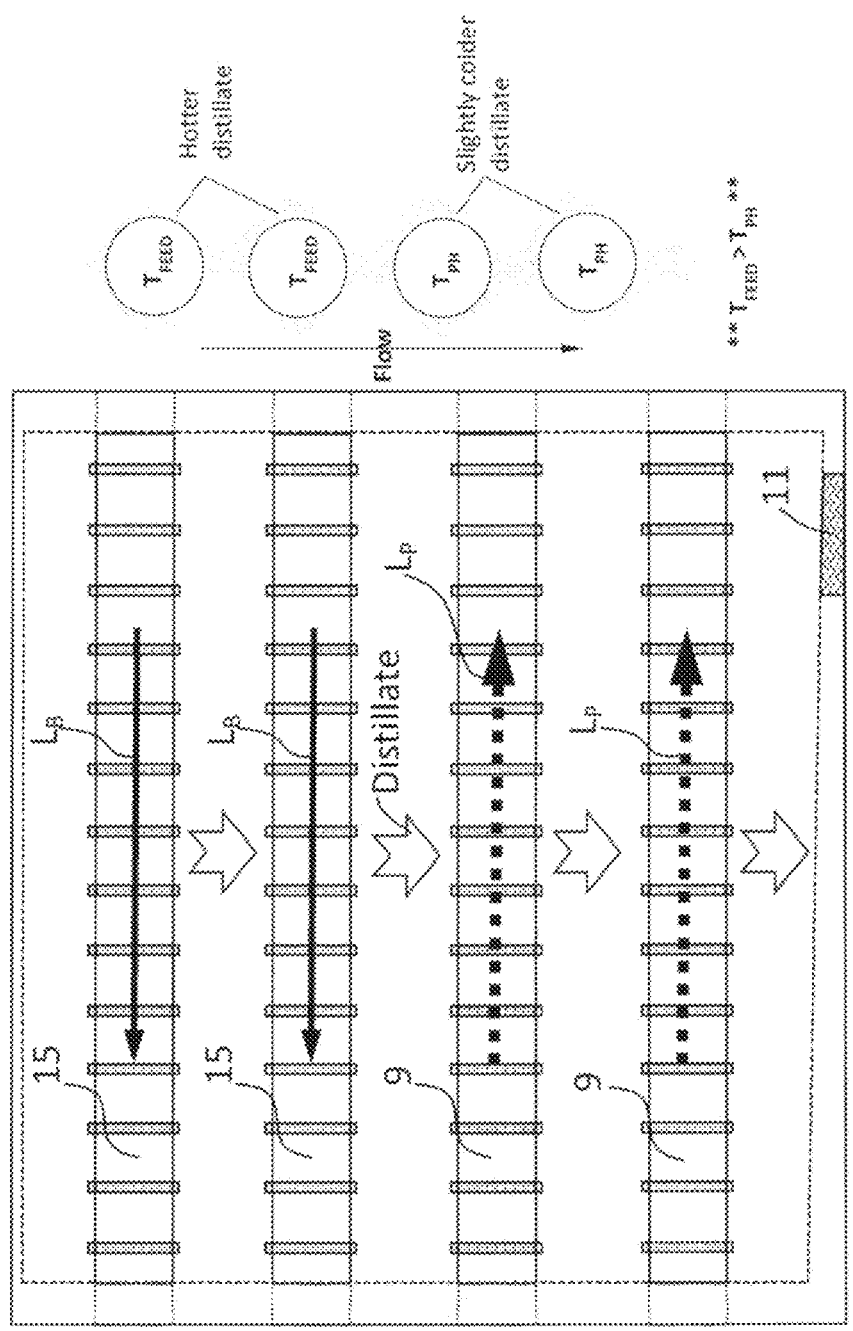
FIG. 8 is a schematic front view of the vapor section illustrated in FIG. 4.

In the alternative embodiment shown in FIGS. 4 and 8, two vertically spaced-apart preheating tubes 9 are disposed in the bottom part of each vapor section 3 of the distilling units 1a-1d and two vertically spaced-apart internal boiling tubes 15 are disposed in the top part of each vapor section 3. These internal boiling tubes 15 are flowed through by the boiling raw feed liquid $L_B$ exiting from the outlet port 5 of the boiling liquid section 2 disposed upstream thereof relative to the flow direction of said boiling raw feed liquid $L_S$ and are in fluidic communication with the inlet port 4 of the boiling liquid section 2 disposed downstream relative to the flow direction of said boiling raw feed liquid $L_B$, preferably via a throttle or flash valve. The vapor contained in the vapor sections 3 condenses against the peripheral external surfaces of both said preheating tubes 9 and said internal boiling tubes 15, which induces flow boiling inside said internal boiling tubes 15. The distillate liquid produced by the condensation of the vapor against the external surfaces of the internal boiling tubes 15 may advantageously have a higher temperature than the raw feed liquid $L_P$ flowing inside the preheating tubes 9, thus advantageously preheating said raw feed liquid $L_P$.

Figure 5:
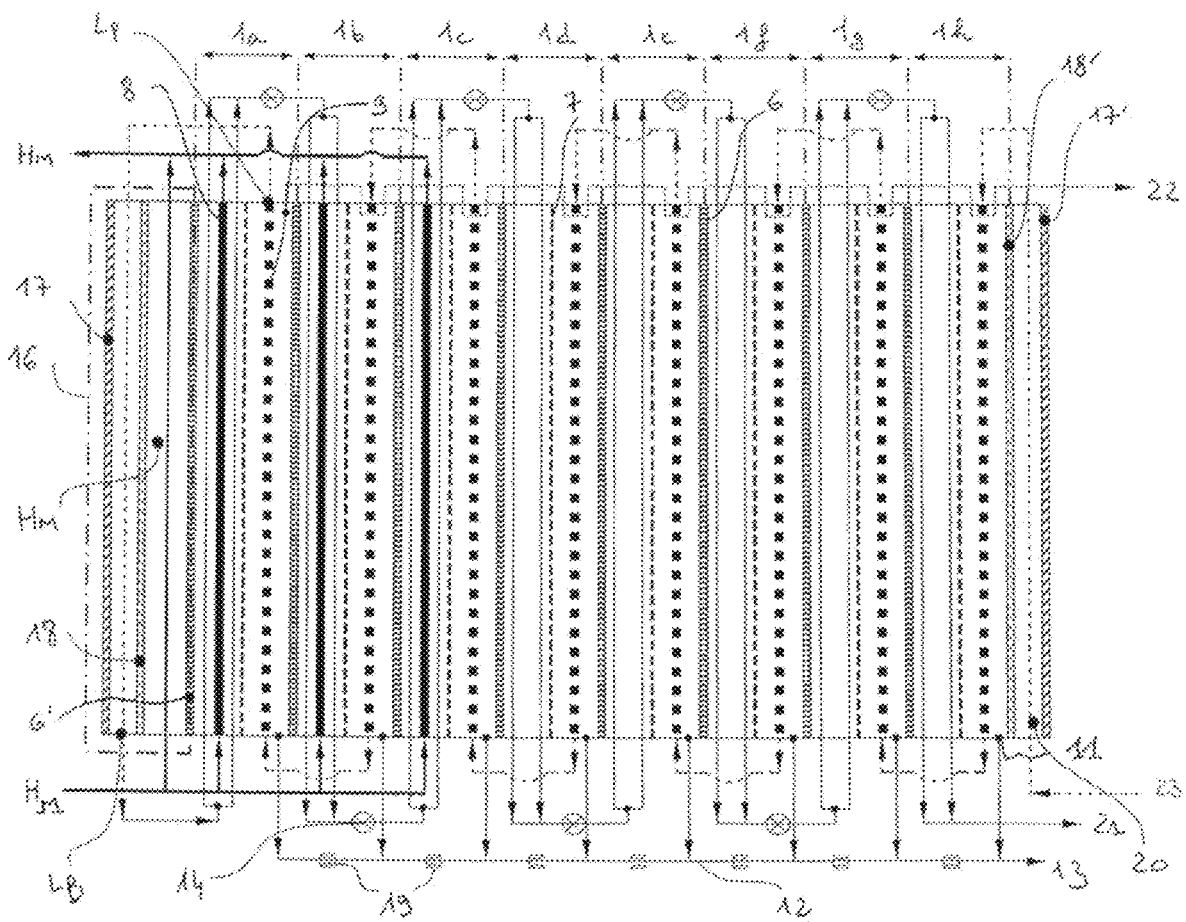
FIG. 5 is a schematic top view of a thermal water purification system similar to the one illustrated in FIG. 1, but with eight consecutive distilling units.
Figure 6:
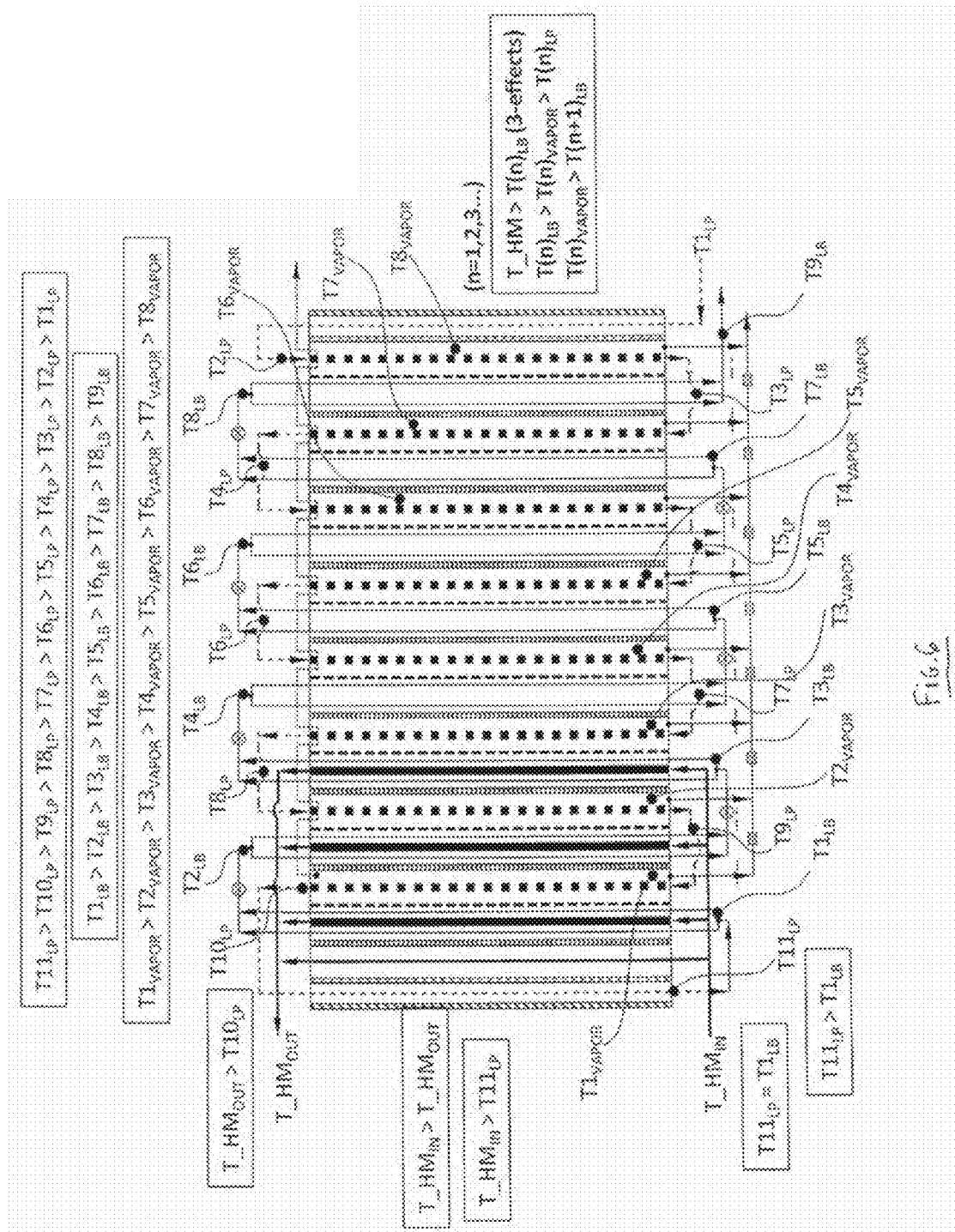
FIG. 6 is a view similar to FIG. 5, except that the temperatures of the liquid or vapor at each step of the purification process is shown.

In the embodiment shown in FIGS. 5 and 6, the system 10 comprises eight consecutive distilling units 1a to 1h, said distilling units having substantially the same structure as the distilling units illustrated in FIG. 1. However, in this embodiment, the heat exchanger tubes 8 extend only through the boiling liquid sections 2 of the first, second and third distilling units 1a, 1b and 1c. These heat exchanger tubes 8 are positioned downstream of a heat exchanger cavity 16 that composes an insulation wall 17 and a heat transfer plate 18 horizontally spaced-apart therefrom, said heat transfer plate 18 being horizontally spaced-apart from the first separation plate 6' bordering the boiling liquid section 2 of the first distilling unit 1a. The insulation wall 17 and the heat transfer plate 18 define a first flow path for the preheated raw feed liquid $L_P$ exiting from the preheating tubes 9 of the first distilling unit 1a and the heat transfer plate 18 and the first separation plate 6' define a second flow path for the hot medium $H_M$. Thus configured, the heat exchanger cavity 16 permits to heat the raw feed liquid $L_P$ flowing through the first flow path via the heat transfer plate 18. As shown in FIG. 6, due to the higher temperature T_HM of the hot medium $H_M$ relative to the temperature $T10_{LP}$ of the raw feed liquid $L_P$ exiting from the preheating tubes 9 of the first distilling unit 1a, the temperature of the raw feed liquid $L_P$ increases to reach temperature $T11_{LP}$ at the exit of the first flow path and before said raw feed liquid $L_P$ is channeled via conduits towards the boiling liquid section 2 of said first distilling unit 1a. This final temperature $T11_{LP}$ is substantially equal to or slightly higher than the initial temperature $T1_{LB}$ of the boiling raw feed liquid $L_B$ that flows through the successive boiling liquid sections 2 of the distilling units 1a to 1h. Therefore, this final temperature $T11_{LP}$ may advantageously be equal to the boiling point of the raw feed liquid $L_B$ so that the boiling process occurs almost immediately when the boiling raw feed liquid $L_B$ enters in the boiling section 2 of the first distilling unit 1a.

The system 10 illustrated in FIGS. 5 and 6 also comprises a preheating chamber 20 disposed upstream of the last distilling unit 1h relative to the flow direction of the raw feed liquid $L_P$. This preheating chamber 20 comprises an insulation wall 17' and a heat transfer plate 18' horizontally spaced-apart therefrom, said heat transfer plate 18' bordering the vapor section 3 of the last distilling unit 1h. The insulation wall 17' and the heat transfer plate 18' define a first flow path for the raw feed liquid $L_P$ supplied from a raw liquid source 23. Thus configured, the preheating chamber 20 permits to heat the raw feed liquid $L_P$ via the heat transfer plate 18' due to the higher temperature $T8_{VAPOR}$ of the vapor flowing inside the vapor section 3 of the last distilling unit 1h relative to the temperature $T1_{LP}$ of the raw feed liquid $L_P$ of the first flow path. Thus, the temperature of the raw feed liquid $L_P$ increases to reach a final temperature $T2_{LP}$ of said first flow path and before said raw feed liquid $L_P$ is channeled via conduits inside the preheating tubes 9 of the last distilling unit 1h.

As illustrated in FIG. 5, the system 10 may advantageously comprise a distillate conduit 12 in fluidic communication with the distillate discharge ports 11 of the distilling units 1a to 1h, said distillate conduit 12 channeling the distillate liquid towards a storage tank 13 via a plurality of constrictions 19, said constrictions 19 permitting to isolate the varying pressures occurring inside the distillate conduit 12. Indeed, from the first distilling unit 1a to the last distilling unit 1h, the pressure of the distillate liquid tends to decrease. The system 10 may also comprise a brine discharge 21 for collecting the concentrated boiling raw feed liquid $L_B$ exiting from the boiling liquid section 2 of the last distilling unit 1h and a non-condensable gas line 22 for collecting the non-condensable gasses exiting from the vapor sections 3 of the distilling units 1a to 1h.

Thus, the operating steps of the system 10 shown in FIGS. 5 and 6 are successively:

a) channeling the raw feed liquid $L_P$ having initially a first temperature $T1_{LP}$ towards the boiling liquid section 2 of a first distilling unit 1a through a plurality of preheating tubes 9 adapted to increase the temperature $T(n)_{LP}$ of the raw feed liquid $L_P$ from said first temperature $T1_{LP}$ to a second temperature $T11_{LP}$;

b) channeling the boiling raw feed liquid $L_B$ having initially a temperature $T1_{LB}$, said temperature $T1_{LB}$ being equal to or slightly lower than said second temperature $T11_{LP}$, into the boiling liquid sections 2 of said first distilling unit 1a and, thereafter, of the consecutive distilling units 1b to 1h;

c) heating said boiling raw feed liquid $L_B$ with a plurality of heat exchanger tubes 8 extending through the boiling liquid sections 2 of said first distilling unit 1a and two further consecutive distilling units, 1b and 1c, so as to boil the raw feed liquid $L_B$ flowing inside said boiling liquid sections 2, with a decrease in the temperature $T(n)_{LB}$ of the boiling raw feed liquid $L_B$ in each boiling liquid section 2 due to the drop of pressure inside each boiling liquid section 2 from the inlet port 4 thereof to the outlet port 5 thereof;

d) passing the vapor produced by the boiling raw feed liquid $L_B$ boiling in the boiling liquid section 2 of each distilling unit through the liquid-tight and vapor-permeable membrane 7 into the vapor section 3 adjacent thereto;

e) condensing said vapor into said vapor section 3 to produce a distillate liquid;

f) channeling said distillate liquid into the storage tank 13.

As defined in independent claim 8, these operating steps can be adapted to any systems 10 having at least one distilling unit.

Furthermore, these operating steps can be adapted to a system 10 having the specific embodiment illustrated in FIG. 4. Thus, simultaneously to step b), a further step b') may consist in channeling the boiling raw feed liquid $L_B$ exiting from the outlet ports 5 of the boiling liquid section 2 of an upstream distilling unit into the vapor section 3 thereof through at least one internal boiling tube 15 before channeling said boiling raw feed liquid $L_B$ into the boiling liquid section 2 of a downstream distilling unit, said upstream and downstream distilling units being any two consecutive distilling units of the system.

Figure 9:
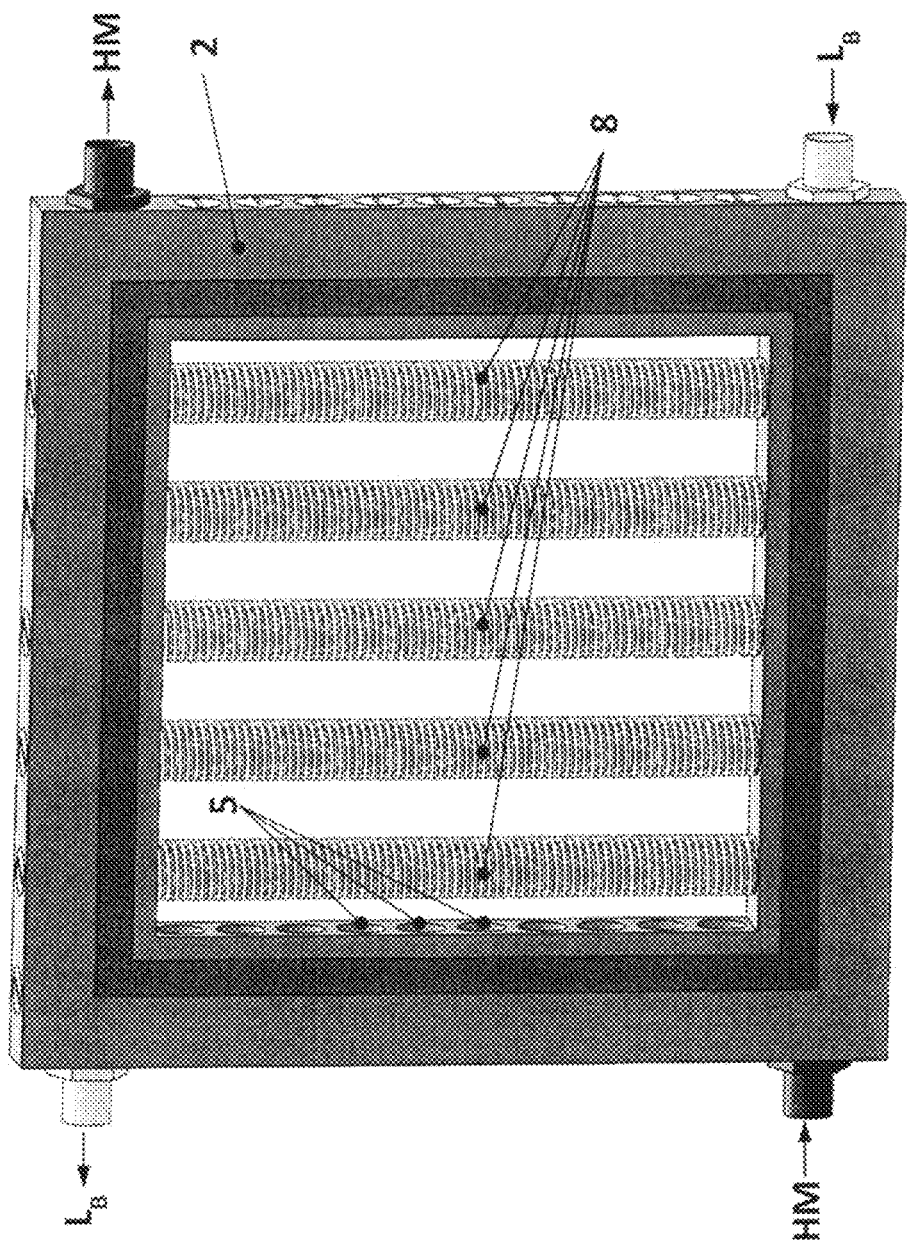
FIG. 9 is a perspective view of an exemplary embodiment of a boiling liquid section of the system of the present invention.
Figure 14:
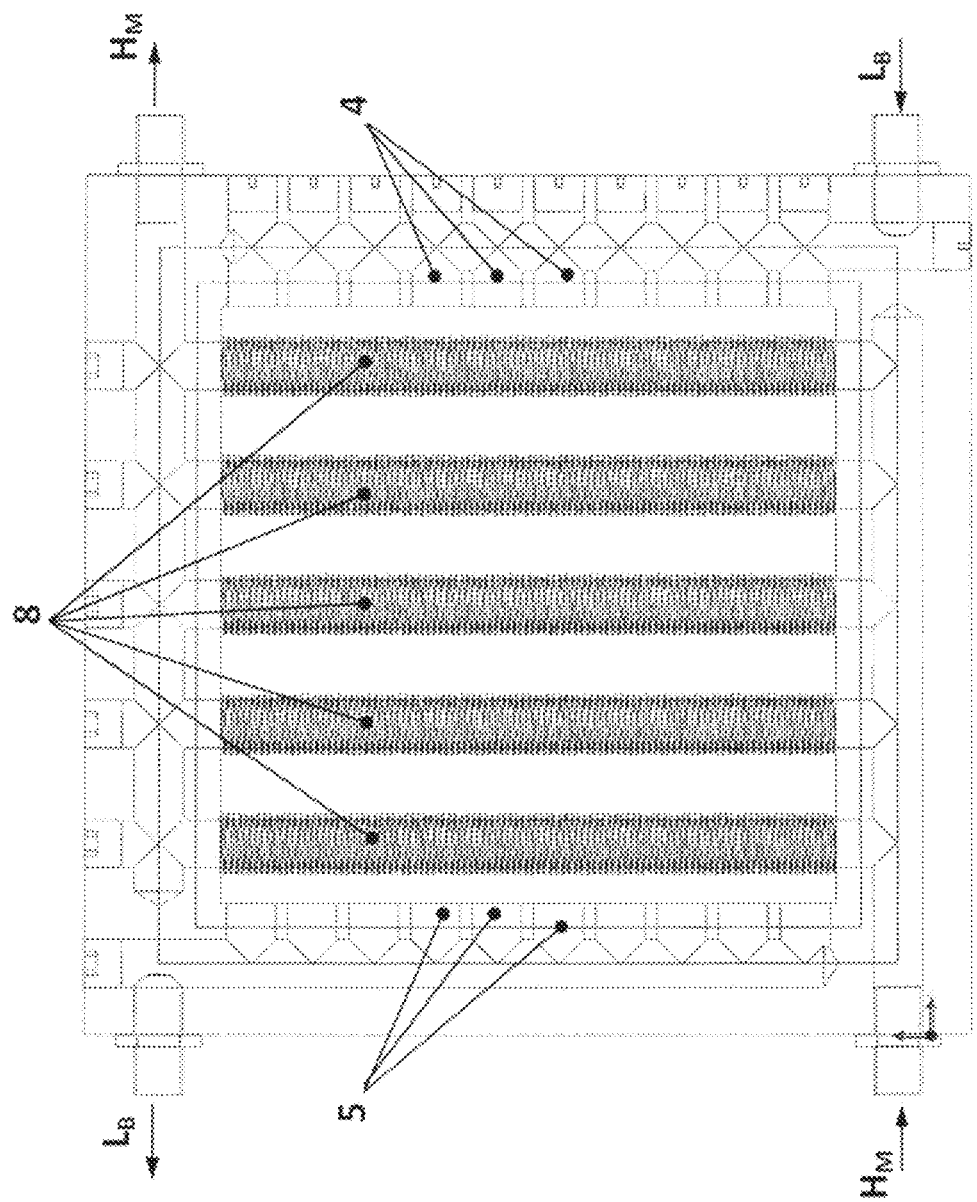
FIG. 14 is a front view of the boiling liquid section illustrated in FIG. 9, the elements surrounding the heat exchanger tubes being seen by transparency.

FIGS. 9 and 14 illustrate a boiling liquid section 2 comprising five vertically oriented and horizontally spaced-apart heat exchanger tubes 8, and several inlet ports 4 and outlet ports 5. The flow directions of hot medium $H_M$ and boiling raw feed liquid $L_B$ is shown in the same figures.

Figure 10:
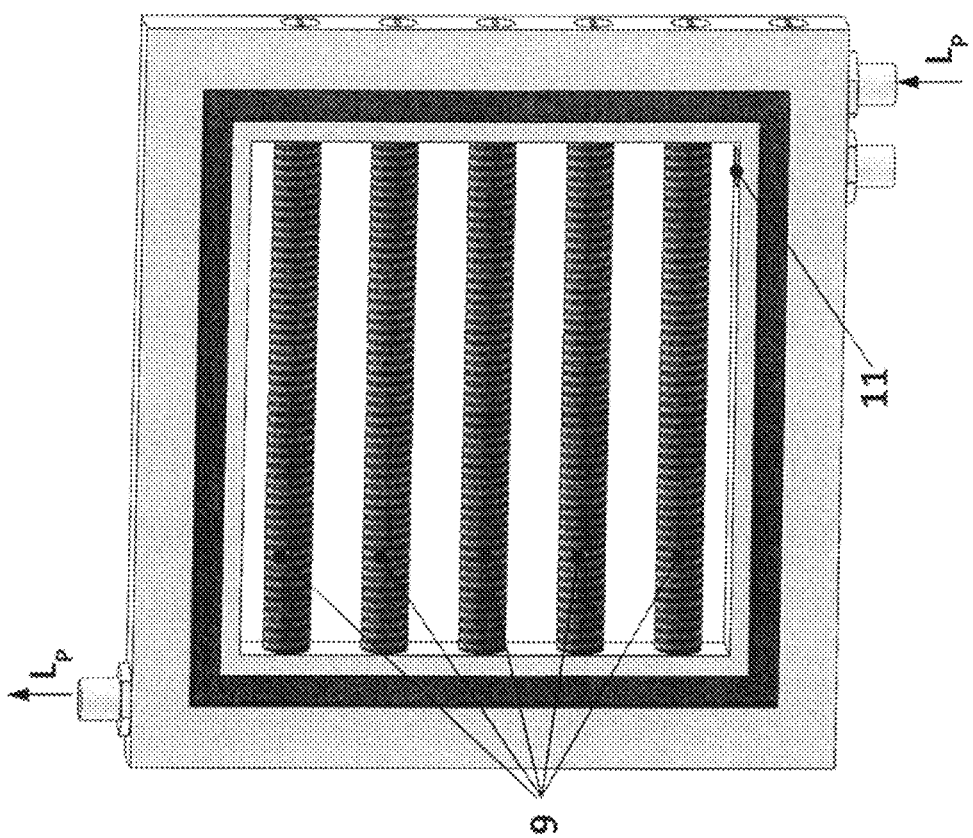
FIG. 10 is a perspective view of a first exemplary embodiment of a vapor section of the system of the present invention.

FIGS. 10 and 15 illustrate a vapor section 3 comprising five horizontally oriented and vertically spaced-apart integrated preheating tubes 9, and a distillate discharge port 11. The flow direction of the raw feed liquid $L_P$ is shown in the same figures.

Figure 11:
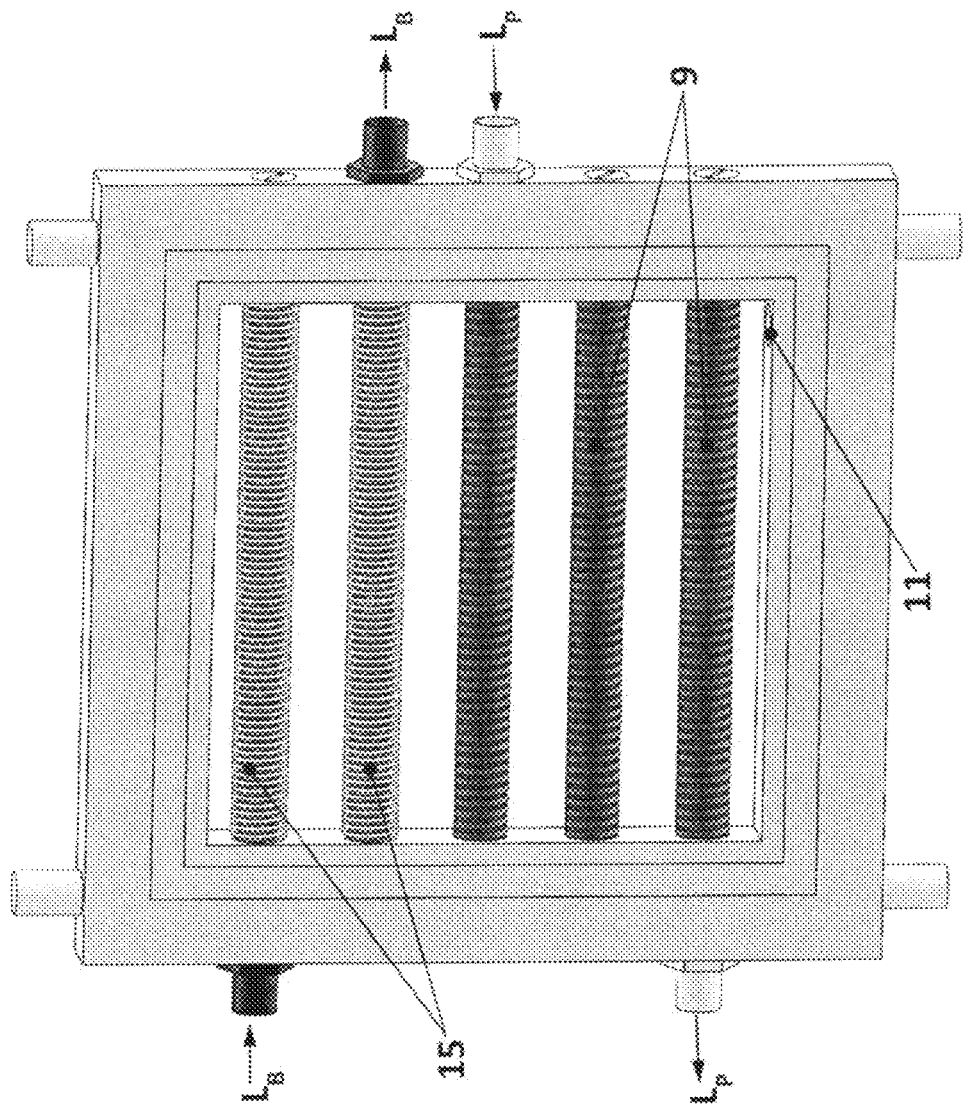
FIG. 11 is a perspective view of a second exemplary embodiment of a vapor section of the system of the present invention.

FIG. 11 illustrates a vapor section 3 comprising two horizontally oriented and vertically spaced-apart integrated internally boiling tubes 15 positioned at the top part of said vapor section and three horizontally oriented and vertically spaced-apart preheating tubes 9 positioned at the bottom part of said vapor section. Distillate discharge port 11, the raw feed liquid $L_P$ and the boiling raw feed liquid to are also shown in the same figure.

Figure 12:
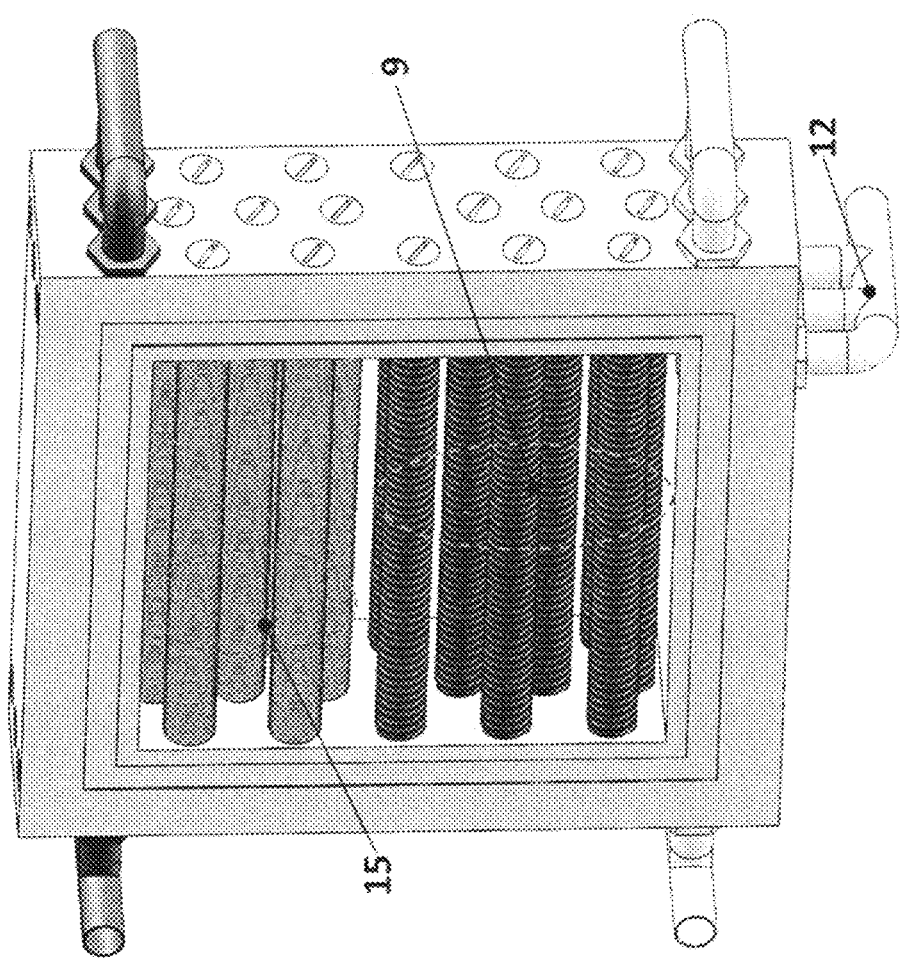
FIG. 12 is a perspective view of a third exemplary embodiment of a vapor section of the system of the present invention.

FIG. 12 illustrates a vapor section 3 comprising an array of internally boiling tubes 15 positioned at the top part of said vapor section, an array of preheating tubes 9 positioned at the bottom part of said vapor section and a distillate conduit 12 in fluidic communication with the distillate discharge ports 11 of said vapor section.

Figure 13:
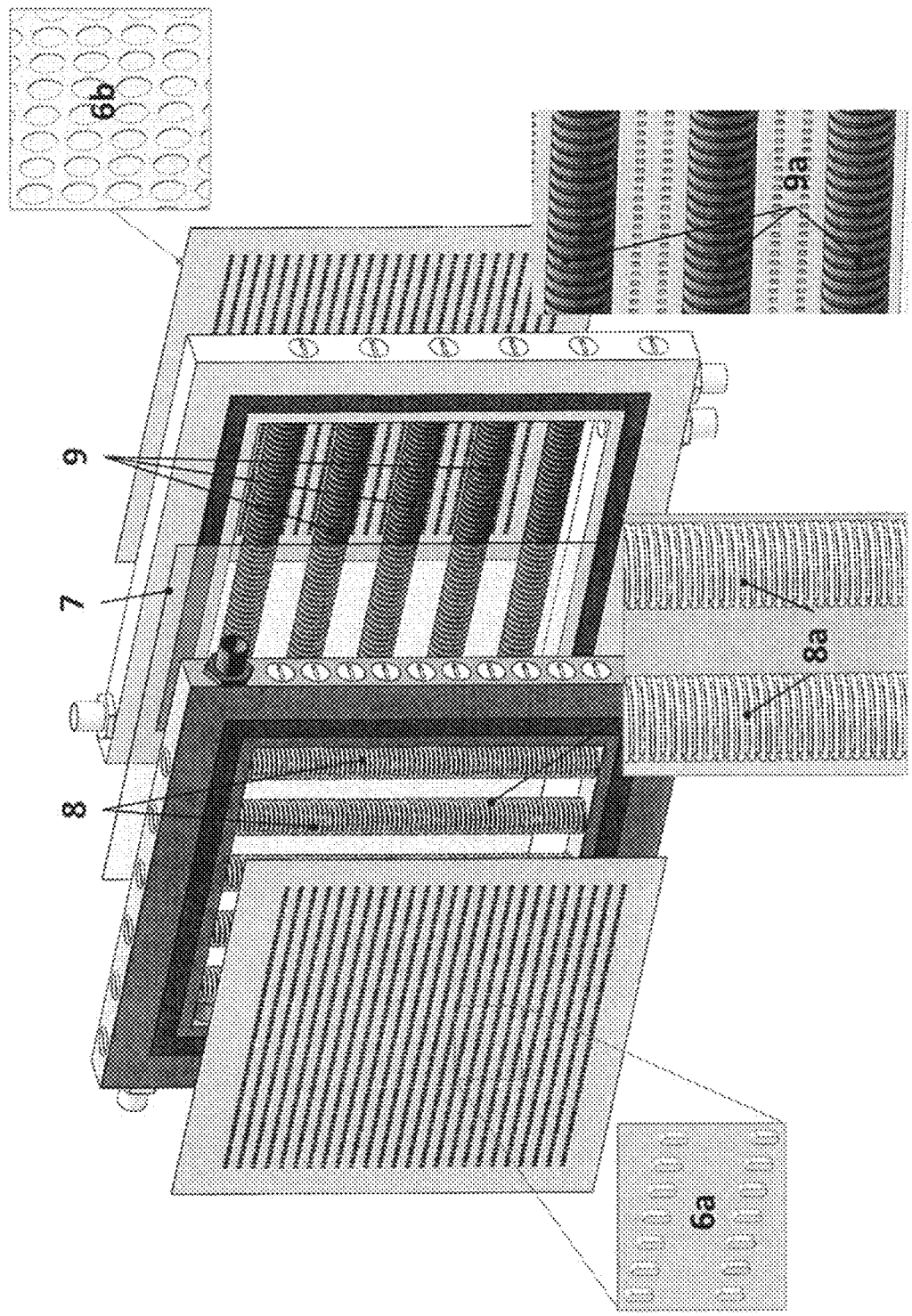
FIG. 13 is a exploded perspective view of an exemplary embodiment of a distilling unit of the system of the present invention.

FIG. 13 illustrates a distilling unit comprising a microstructured condensation surface 6a positioned in front of the boiling liquid section 2 illustrated in FIG. 9, and the vapor section 3 illustrated in FIG. 10 positioned in front of condensation surface 6a with hotter surface 6b located on the opposite side of condensation surface 6a, said boiling liquid section 2 and said vapor section 3 being separated by a liquid-tight and vapor-permeable membrane 7. Flow boiling in the boiling liquid section 2 occurs on the external surface 8a of the heat-exchanger tubes 8 while vapor condensation in the vapor section 3 occurs on the external surface 9a of the preheating tubes 9 and condensation surface 6a.

The above detailed description with reference to the drawings illustrates rather than limits the invention. There are numerous alternatives, which fall within the scope of the appended claims. In particular, in a further embodiment of the present invention, the thermal water purification system may include a plurality of consecutive modules, each module comprising several consecutive distilling units and being in a fluidic communication with an adjacent module via bifurcating flow configuration for the boiling raw feed liquid flowing inside the boiling liquid sections. The raw feed liquid flowing inside the preheating tubes can advantageously be in a bifurcating flow configuration.

Three examples are given below to compare the performance simulation of the current invention (Example 3) with MD systems from known prior arts (Examples 1 and 2).

System Parameters:

i) Thermal source=30 kW, II) Assumed system efficiency, n=80%, III) $T_{feed,in}$=25° C., IV) $T_{feed,final}$=70° C., V) Feed flow rate, $V_{feed}$=7 l/min. VI) Latent heat, $H_{LV}$=2,333 kJ/kg (assumed constant for water at 70° C.), VII) Assumed specific membrane flux, N=10 L/min. VIII) Membrane area/per effect, $A_m$=0.5 m$^2$, IX) density, p=1 kg/liter and, X) No. of effects=8.

Note:

US 2010/0072135 A1 claimed an optimum specific flux measurement of $1.9\times10^{-10}$ m$^3$/m$^2$s-Pa. Assuming a nominal driving force, ΔP3.5 kPa (0.035 bar), the specific membrane flux achieved is 2.4 L/m$^2$-hr. Partial vapor for water at T=70° C. ($P_v$=31.2 kPa) and T=25° C. ($P_v$=3.17 kPa). Hence, assumed nominal driving force of 35 kPa in each module is evaluated as (31.2-3.17)/8-effect.

Zhao et al. (2013) obtained a specific membrane flux of 3.0-8.7 L/m$^2$-hr from their experiments.

The assumption of 10 L/m$^2$-hr for this simulation is to provide an unbiased comparison with MD inventions from known prior arts.

Example 1: 8-Effect MD System with Vapor Transmission Lines but without Feed Preheating

| | | |
|---|---|---|
| Total membrane area ($A_m$ × 8-effect) | 4.0 | m² |
| First module thermal energy consumption for MD evaporation (N × $A_m$ × $H_{LV}$/3600 s) | 3.24 | kW |
| Total distillate produced (N × $A_m$ × 8-effect × η) | 32 | L/hr |
| Total output equivalent thermal energy (Total distillate produced/3600 s × $H_{LV}$) | 20.74 | kW |

The first effect (steam riser) of the MD system can only consume 3.24 KW (10.8%) out of the total available thermal energy of 30 kW. To consume the total thermal load of 30 kW, the membrane area would have to be enlarged by 9.26 times to 4.63 m²/effect and a total system membrane area to 37.04 m². No condensation losses in the transmission lines were assumed in the simulation.

Example 2: 8-Effect MD System with Vapor Transmission Lines and Feed Preheating

| | | |
|---|---|---|
| First module thermal energy consumption for MD evaporation (N × $A_m$ × $H_{LV}$/3600) | 3.24 | kW |
| First module thermal energy consumption for feed preheating ($V_{feed}$/60 × ($T_{feed,final}$ − $T_{feed,in}$) × Cp (4189 kJ/kg-K)/(8-effect × η)) | 3.44 | kW |
| First module thermal energy consumption (N × $A_R$ × $H_{LV}$/3600) | 6.68 | kW |
| Total membrane area required to implement MD and feed preheating, $A_R$ | 1.03 | m² |
| Total distillate produced (N × $A_R$ × 8-effect × η) | 65.9 | L/hr |
| Total output equivalent thermal energy (Total distillate produced/3600 s × $H_{LV}$) | 42.72 | kW |
| Total membrane area ($A_R$ × 8-effect) | 8.24 | m² |

With feed preheating, the first membrane module is capable of consuming 6.68 kW (22.3%) of the total available thermal energy of 30 kW. However, the membrane area will have to be increased from 0.5 m² to 1.03 m² to produce enough vapor to accommodate feed preheating. The total system membrane area has now increased to 8.24 m². No condensation losses in the transmission lines were assumed in the simulation. Due to the presence of vapor transmission lines, no performance enhancement in the MD process was taken into account.

Example 3

Current invention as per the embodiment shown in FIG. 5 with direct condensation and internal flow boiling tubes implemented into the first three modules. An equal distribution of thermal energy for flow boiling in the three modules is assumed for this simulation. In practical applications, the first effect can preferably be imposed a much higher thermal load to increase distillate production and thermal efficiency.

| | | |
|---|---|---|
| Total membrane area ($A_m$ × 8-effect) | 4.0 | m² |
| First module thermal energy consumption for MD evaporation (N × $A_m$ × $H_{LV}$/3600) | 3.24 | kW |
| Thermal energy required for raw feed preheating/effect | 3.44 | kW |
| Thermal energy consumption via tube boiling (First distilling effect) → (30 kW − 3.24 kW)/3-effects | 8.92 | kW |
| Thermal energy consumption via tube boiling (Second distilling effect) → (30 kW − 3.24 kW)/3-effects | 8.92 | kW |
| Thermal energy consumption via tube boiling (Third distilling effect) → (30 kW − 3.24 kW)/3-effects | 8.92 | kW |
| Estimated MD performance enhancement due to direct condensation and internal flow boiling | 10 | % |
| Total distillate produced via MD (N × $A_m$ × 8-effect × η × 1.1) | 35.2 | L/hr |
| Total distillate produced via boiling in first effect → (8920/$H_{LV}$ × 3600) + ((8920 − 3440)/$H_{LV}$ × 3600 × 7-effect × η) | 66.1 | L/hr |
| Total distillate produced via boiling in first effect → (8920/$H_{LV}$ × 3600) + ((8920 − 3440)/$H_{LV}$ × 3600 × 6-effect × η) | 54.4 | L/hr |
| Total distillate produced via boiling in first effect → (8920/$H_{LV}$ × 3600) + ((8920 − 3440)/$H_{LV}$ × 3600 × 5-effect × η) | 47.6 | L/hr |
| Total distilate produced via MD and boiling | 203.3 | L/hr |
| Total output equivalent thermal energy (Total distillate produced/3600 s × $H_{LV}$) | 131.75 | kW |

The thermal energy required for MD is 3.24 kW while the remaining 27.76 kW being distributed into the heat exchanger boiling tubes in the first three (3) effects, i.e. 8.92 kW for boiling/effect. A total thermal load of 30 kW is consumed for vaporization of liquid to produce distillate and raw liquid feed preheating while maintaining the membrane area at 0.5 m² per effect, i.e. total system membrane area of 4.0 m². Simulated performance indicated a 4.76 times increase m distillate production capacity when compared to MD system with preheating features while 6.35 times more distillate production was encountered when compared to a MD system without feed preheating.

The invention claimed is:

1. A thermal water purification system for producing a distillate liquid from a raw feed liquid, comprising:
   a plurality of distilling units which are consecutively flowed through by the raw feed liquid, wherein the plurality of distilling units includes a first distilling unit and a plurality of consecutive distilling units;
      wherein each distilling unit comprises a boiling liquid section and a vapor section adjacent thereto;
      wherein the boiling liquid section of each distilling unit comprises a plurality of inlet ports and outlet ports, through which respectively enters and exits the raw feed liquid; and
      wherein any two consecutive distilling units, respectively an upstream distilling unit and a downstream distilling unit, are implemented such that the boiling liquid section of the downstream distilling unit is separated from the vapor section of the upstream distilling unit by a liquid-tight and vapor-tight separation plate, and separated from the vapor section of the downstream distilling unit by a liquid-tight and vapor-permeable membrane;
   a heat exchanger cavity adapted to transfer thermal energy to the raw feed liquid before the raw feed liquid enters into the boiling liquid section of the first distilling unit;
   a plurality of heat exchanger tubes in fluidic communication with the heat exchanger cavity and extending through the boiling liquid section of said first distilling unit, said heat exchanger tubes being configured to transfer thermal energy from a hot medium contained thereinside to the raw feed liquid flowing thereoutside, thus leading the raw feed liquid to boil inside the boiling liquid section of the first distilling unit;

a plurality of preheating tubes extending through the vapor section of each distilling unit, said preheating tubes being consecutively flowed through by the raw feed liquid before said raw feed liquid flows inside the boiling liquid sections of the distilling units and being configured to heat the raw feed liquid contained thereinside by using thermal energy transferred by vapor contained inside the vapor sections of the distilling units when said vapor condenses against external surfaces of the preheating tubes, thus producing a distillate liquid that flows outside of the vapor section of each distilling unit, each distilling unit having a distillate discharge port through which the distillate liquid flows; and a distillate conduit in fluidic communication with each distillate discharge port, said distillate conduit supplying a storage tank with the distillate liquid.

2. The thermal water purification system according to claim 1, wherein said first distilling unit is positioned upstream from the plurality of consecutive distilling units of the thermal water purification system, thus leading to a decrease of the temperature of the raw feed liquid when it flows from said first distilling unit to said plurality of consecutive distilling units.

3. The thermal water purification system according to claim 1, wherein a plurality of heat exchanger tubes further extends through each boiling section of i further consecutive distilling units amongst the plurality of consecutive distilling units, i being an integer greater than 0.

4. The thermal water purification system according to claim 1, wherein any two consecutive distilling units, respectively an upstream distilling unit and a downstream distilling unit, are implemented such that the inlet ports of the boiling liquid section of the downstream distilling unit are in fluidic communication with the outlet ports of the boiling liquid section of the upstream distilling unit.

5. The thermal water purification system according to claim 1, wherein any two consecutive distilling units, respectively an upstream distilling unit and a downstream distilling unit, are implemented such that the outlet ports of the boiling liquid section of the upstream distilling unit are in fluidic communication with at least one internal boiling tube extending through the vapor section of said upstream distilling unit and such that the inlet ports of the boiling liquid section of the downstream distilling unit are in fluidic communication with said at least one internal boiling tube.

6. The thermal water purification system according to claim 1, wherein the separation plate separating the vapor section of an upstream distilling unit from the boiling liquid section of a downstream distilling unit is configured to heat the raw feed liquid contained inside said boiling liquid section by using thermal energy transferred by the vapor contained inside said vapor section when said vapor condenses against a condensation surface of said separation plate, thus leading the raw feed liquid to boil inside said boiling liquid section.

7. The thermal water purification system according to claim 1, wherein the preheating tubes are provided with projecting fins and ribs arranged along their periphery, said fins and ribs enhancing the heat transfer between the outside of each preheating tube and the inside thereof.

8. The thermal water purification system according to claim 3, wherein i+1 represents less than 40% of the total number of the distilling units of the thermal water purification system.

9. The thermal water purification system according to claim 4, wherein the inlet ports of the boiling liquid section of the downstream distilling unit are in fluidic communication with the outlet ports of the boiling liquid section of the upstream distilling unit via a throttle or flash valve.

10. The thermal water purification system according to claim 5, wherein the inlet ports of the boiling liquid section of the downstream distilling unit are in fluidic communication with said at least one internal boiling tube via a throttle or flash valve.

11. A method for operating the thermal water purification system according to claim 1, comprising the steps of:
a) channeling the raw feed liquid having initially a first temperature towards the boiling liquid section of the first distilling unit through the plurality of preheating tubes so as to increase the temperature of the raw feed liquid from said first temperature to a second temperature;
b) channeling the raw feed liquid having initially said second temperature towards the boiling liquid section of said first distilling unit through the heat exchanger cavity so as to increase the temperature of the raw feed liquid from said second temperature to a third temperature using the thermal energy transferred from the hot medium;
c) channeling the raw feed liquid having initially said third temperature, or a temperature slightly lower than said third temperature, into the boiling liquid section of said first distilling unit and, thereafter, into the boiling liquid sections of the plurality of consecutive distilling units;
d) heating said raw feed liquid with the plurality of heat exchanger tubes extending through the boiling liquid section of said first distilling unit, so as to boil the raw feed liquid flowing inside the boiling liquid section of the first distilling unit, with a decrease in the temperature of the raw feed liquid due to the drop of pressure inside the boiling liquid section of the first distilling unit from the inlet ports thereof to the outlet ports thereof;
e) passing the vapor produced by the raw feed liquid boiling in the boiling liquid section of each distilling unit through the liquid-tight and vapor-permeable membrane into the vapor section adjacent thereto;
f) condensing said vapor into said vapor section to produce the distillate liquid; and
g) channeling said distillate liquid into the storage tank.

12. The method according to claim 11, further comprising, simultaneously to step c), a step c') including in channeling the raw feed liquid exiting from the outlet ports of the boiling liquid section of an upstream distilling unit into the vapor section thereof through at least one internal boiling tube before channeling said raw feed liquid into the boiling liquid section of a downstream distilling unit, said upstream and downstream distilling units being any two consecutive distilling units of the thermal water purification system.

13. The method according to claim 11, wherein, during step c), the raw feed liquid is boiling.

14. The method according to claim 11, wherein, during step f), the condensation of the vapor occurs against external surfaces of the preheating tubes and against a condensation surface of each of the separation plates of the thermal water purification system.

15. The method according to claim 11, wherein step d) further includes heating said row feed liquid with a plurality of heat exchanger tubes extending through each boiling section of i further consecutive distilling units amongst the plurality of consecutive distilling units, i being an integer greater than 0.

16. The method according to claim 12, wherein, during step f), the condensation of the vapor occurs against external surfaces of the preheating tubes and against a condensation surface of each of the separation plates of the thermal water purification system, as well as against an external surface of said at least one internal boiling tube.

\* \* \* \* \*

UNITED STATES PATENT AND TRADEMARK OFFICE
CERTIFICATE OF CORRECTION

PATENT NO. : 10,702,830 B2
APPLICATION NO. : 16/083731
DATED : July 7, 2020
INVENTOR(S) : Chin Lee Ong et al.

Page 1 of 1

It is certified that error appears in the above-identified patent and that said Letters Patent is hereby corrected as shown below:

In the Specification

Column 2
- Line 67: "… without towering the vapor …" to be replaced with "… without lowering the vapor …"

Column 3
- Line 47: "… i) flew …" to be replaced with "… i) flow …"

Column 7
- Line 2: "… two-phase food mixture …" to be replaced with "… two-phase feed mixture …"
- Line 49: "… exchanger lubes …" to be replaced with "… exchanger tubes …"

Column 9
- Lines 3-4: "… distilling unit, improvements …" to be replaced with "… distilling unit. Improvements …"

Column 11
- Line 62: "… raw feed liquid $L_S$ …" to be replaced with "… raw feed liquid $L_B$ …"

Column 12
- Line 49: "… wall 17 and a heat transfer plate …" to be replaced with "… wall 17' and a heat transfer plate …"

Column 14
- Line 46: "… n=80%, III) …" to be replaced with "… η = 80%, III) …"
- Lines 47- 48: "… $H_{LV}$=2, 333 kJ/kg …" to be replaced with "… $H_{LV}$ = 2,333 kJ/kg …"
- Line 60: "… force of 35 kPa …" to be replaced with "… force of 3.5 kPa …"

Column 16
- Line 18: "… to distilate produced …" to be replaced with "… to distillate produced …"

Signed and Sealed this
Twenty-ninth Day of December, 2020

Andrei Iancu
*Director of the United States Patent and Trademark Office*